July 20, 1965  W. TONKOWICH ETAL  3,195,546
VEHICLE WASHING UNIT
Filed Jan. 22, 1964  2 Sheets-Sheet 1
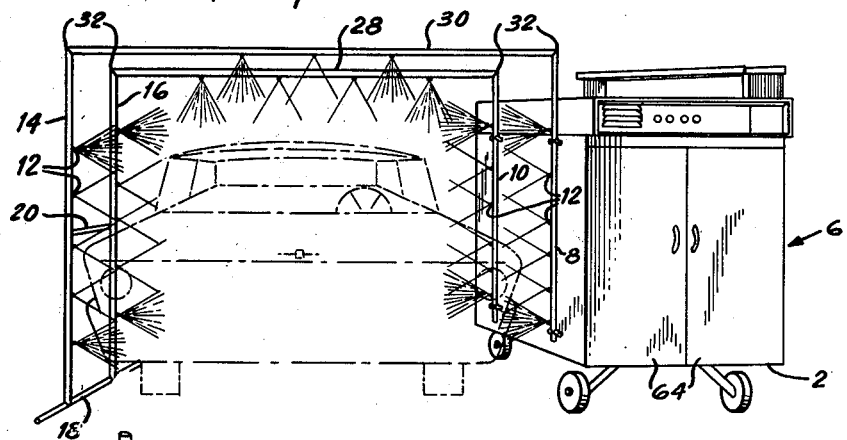
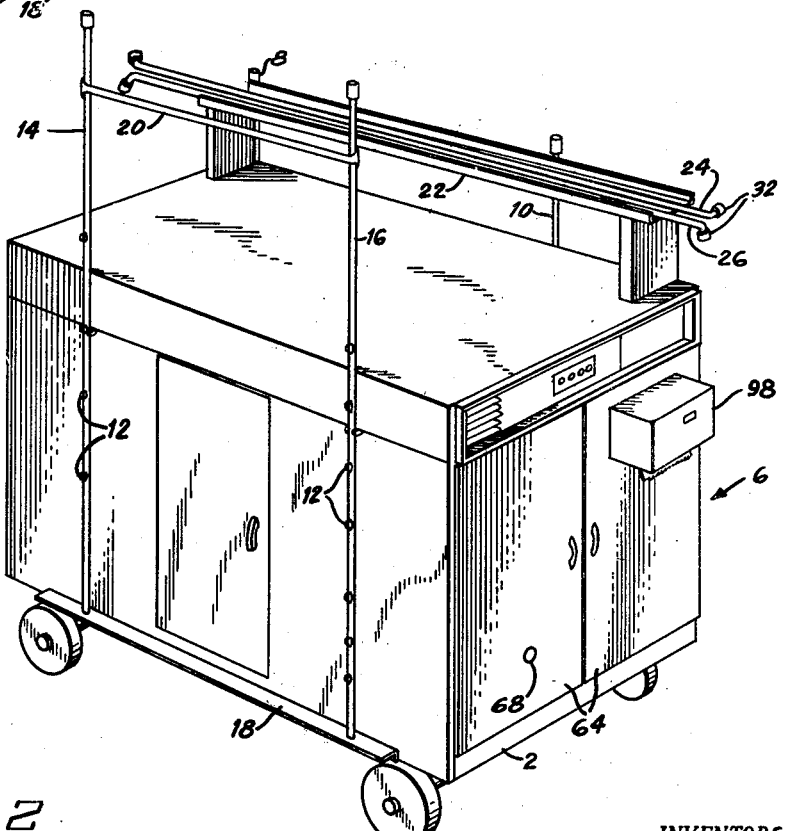
INVENTORS
WILLIAM TONKOWICH
THOMAS PAWELKO
BY
ATTORNEY July 20, 1965   W. TONKOWICH ETAL   3,195,546
VEHICLE WASHING UNIT
Filed Jan. 22, 1964   2 Sheets-Sheet 2

INVENTORS.
WILLIAM TONKOWICH
THOMAS PAWELKO
BY
ATTORNEY

United States Patent Office 3,195,546
Patented July 20, 1965

3,195,546
VEHICLE WASHING UNIT
William Tonkowich and Thomas Pawelko, Franklin Lakes, N.J., assignors to Associated Testing Laboratories, Inc., County of Passaic, N.J., a corporation of New Jersey
Filed Jan. 22, 1964, Ser. No. 339,416
1 Claim. (Cl. 134—45)

This invention relates to vehicle washing apparatus and, particularly, to a portable self-contained vehicle washing unit adapted for convenient transport to and from vehicles to be washed.

Conventionally constructed vehicle washing apparatus are most often in the nature of permanent fixed installations occupying considerable area and being of varying degrees of complexity dependent upon the degree of automation involved. As such most, if not all, of such installations are characterized by relatively high initial component and installation costs, and high maintenance and operating cost in the sense that considerable overhead must be allocated to the space occupied by the installed apparatus. In a conventional service station application, this usually involves the allocation of at least one car repair stall for the washing facility which is not only an appreciable portion of the total service station building area but, also, in most installations, is used only a small portion of the time. In addition, such conventional units are of such nature as to economically preclude change in location once installation has been effected.

Mobile washing units have been previously suggested for the specific purpose of washing railway cars or other objects incorporating extensive planar surfaces. Such suggested units, however, although mobile, are usually unduly large and expensive and are basically unsuited to use as a compact mobile work unit, lacking the necessary features of ready portability and flexibility in assembly and operation required for vehicular washing operations of the type herein of particular concern.

This invention may be briefly described as an improved self-contained construction for a mobile vehicle washing apparatus which, in its broad aspects, includes a wheeled and compartmented housing adapted and arranged to contain and present all facilities necessary to permit customized car washing operations in a more rapid and efficient manner than heretofore attainable and at locations heretofore unavailable for such operations.

Among the advantages of the subject unit is its low cost both initial and installation, and ready adaptability to permit customized car wash operations in amounts and at locations which heretofore were unavailable for car washing. Other advantages include compact size, ready portability and lack of fixed installation requirements, all of which contribute to a self-contained and self-sufficient unit permitting use at any location affording a household electric current and a standard pressure cold water outlet within minutes after its arrival. A still further advantage is the permitted effecting of customized car wash operations with a minimum of manual manipulative operations and a consequent reduction in operator fatigue and effort. Still another advantage of the subject unit is the permitted attainment of car washing operation equivalent or better than that attainable from the conventional large and fixed installation for only a minor fraction of the investment cost involved therein.

It is the primary object of applicants' invention to provide an improved self-contained construction for a compact, portable automotive vehicle washing apparatus.

A further object it to provide a low cost, compact and compartmented portable vehicle washing apparatus combining portable spray loops and auxiliary facilities for effecting customized car washing in a highly efficient manner.

Another object is to provide such a unit as requires only the availability of conventional electric and cold water supply outlets for operation.

A still further object is to provide such a unit as may be set up for operation or conditioned for storage in a matter of several minutes.

A still further object is the provision of a compact, self-contained portable car wash apparatus of improved construction that permits highly efficient customized car washing operations to be effected at locations previously unsuitable therefor.

Still another object of the present invention is the provision of an improved compact car wash apparatus that renders customized car washing operations an economic practicality at locations previously unsuited therefor for physical or economic reasons.

Further objects and advantages will become apparent from the following description and attached drawings, in which:

FIGURE 1 is an oblique view of a preferred embodiment of the invention as the machine is set up for operation;

FIGURE 2 is an oblique view of the unit of FIGURE 1 as set up for movement from one location to another;

Figure 3:
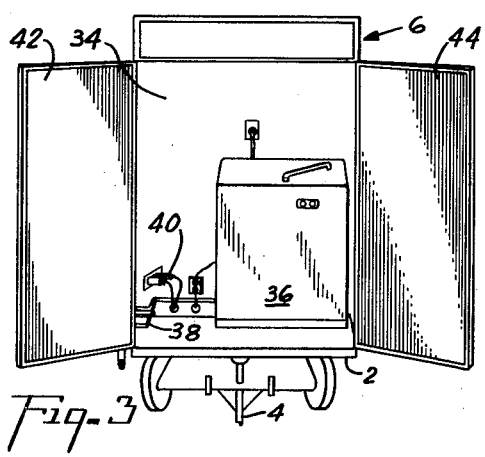
FIGURE 3 is an elevational view of the front of the unit.

Referring to the drawings and particularly to FIGURES 1 and 2, there is provided a compact and ready portable self-contained vehicle washing apparatus comprising a wheeled support 2 having a folding handle 4 for steerage and displacement actuation and a generally rectangularly shaped enclosure 6. Permanently mounted on one side of the enclosure 6 are a pair of selectively spaced and vertically disposed liquid spray pipes 8, 10, each having a plurality of selectively located spray nozzles 12 thereon and selectively connected, internally of the enclosure, to the liquid supply systems as hereinafter will be described. Releasably mounted on the other side of the enclosure 6 is a second pair of liquid spray pipes 14 and 16, terminally secured to a base plate 18 and maintained in parallel spaced relation by a strap member 20. The spray pipes 14 and 16 are also provided with a plurality of spray nozzles 12. Supported in a bracket-like holder member 22 disposed on the top of the enclosure 6 are a pair of spray pipes 24 and 26 having a plurality of spray nozzles therein and terminally provided with quick connect and disconnect elbow type couplings 32, for releasable interconnection with the upper ends of the aforementioned spray pipes 8, 10, 14 and 16. As best shown in FIGURE 1, the spray pipes 14 and 16 are adapted to be disposed in parallel spaced relation with the fixed spray pipes 8, 10 and to be releasably interconnected therewith by the spray pipes 24 and 26 to form a pair of discrete spray loops generally designated 28 and 30.

As will be apparent, the subject construction readily permits the rapid assembly and disassembly of the spray loops 28 and 30 as well as efficient and compact storage of the components thereof in disassembled condition. The quick connect and disconnect elbow type couplings 32 and the complemental fittings at the ends of the vertical spray pipes 8, 10, 14 and 16 may be of any commercially available type and suitable units are readily available from the Ever-Tite Coupling Co. of New York, New York.

Referring now to FIGURES 3 through 6, the rectangular enclosure or housing 6 is internally compartmentalized to selectively locate and discretely position basic operating and accessory equipment in the most efficient manner for use thereof in the customized washing and cleaning of automotive vehicles. For example, the front of the enclosure 6 (as illustrated in FIGURE 3) includes a relatively large compartment 34 is which is disposed a small special high speed automatic washer and spin dryer 36 having suitable water connections 38 and electric connections 40 for cleaning and drying polishing cloths and similar materials. A preferred washer-dryer unit will be capable of cleaning 18 to 20 wiping towels in 10 minutes, thus assuring a continued supply of clean towels even when cars are being washed at full capacity. Center opening vertical hinged doors 42 and 44 provide ready access to the washer-dryer unit compartment 34.

Disposed adjacent thereto and opening intermediate the fixed spray pipes 8, 10 is a second compartment 46 (see FIGURE 5) extending about half the depth of the enclosure 6 and adapted to house a detergent solution tank or reservoir 48, a detergent solution pump 50 and an associated solenoid control valve 52. The detergent solution tank 48 will be connected by suitable internal piping through the detergent solution pump 50 and associated solenoid activated control valve 52 to fixed spray pipe 8 and concomitantly to spray loop 30 for spraying of detergent solution on to a vehicle being washed.

Figure 4:
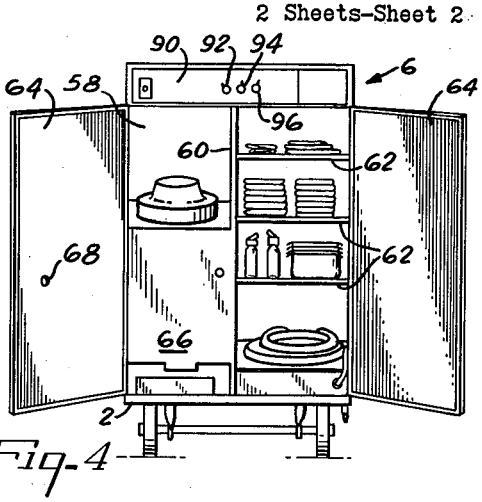
FIGURE 4 is an elevational view of the rear of the unit.
Figure 5:
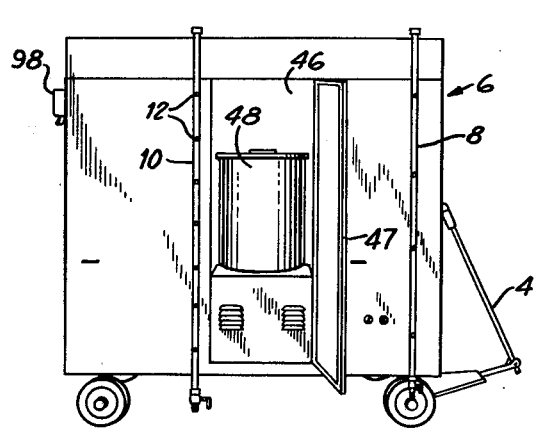
FIGURE 5 is an elevational view of the water delivery side of the unit.

Disposed at the rear of the enclosure 6 (as illustrated in FIGURE 4) is an enlarged storage section 58 having a vertical partition 60 dividing the section into a shelf-storage portion and an interior cleaning device portion. The shelf storage portion is provided with a plurality of shelves 62 for shelf storage of cleaning accessories such as towels, brushes, pans and other material. Access to compartment 46 is provided by a side door 47 and access to compartment 58 is provided by the center opening front doors 64. Disposed within the other portion of the compartment 58 is a built-in industrial vacuum cleaner 66 having its intake pipe disposed in alignment with a suitable aperture 68 in the adjacent door half 64. As illustrated, the shelf storage portion of the compartment 58 is sufficiently amply sized as to permit storage of the vacuum cleaner unit suction hose 70 when the same is not in use. When in use, the terminal end of the hose 70 is readily connected to the cleaner intake pipe through the aperture 68.

Figure 6:
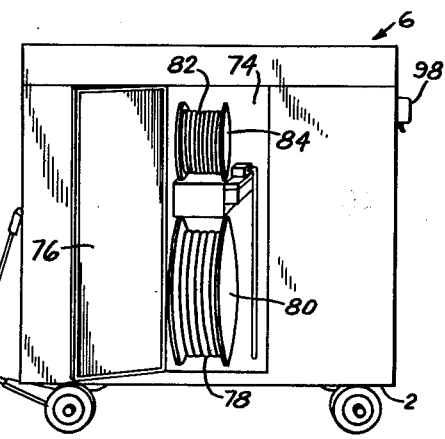
FIGURE 6 is an elevational view of the other side of the unit.

Disposed on the other side of the enclosure 6 (as illustrated in FIGURE 6) is a hose and power cord storage compartment 74 having an access door 76. Compartment 74 preferably contains an extendible water hose 78 for connection to a cold water faucet mounted on a rotatable reel 80 so as to facilitate hose withdrawal and compact storage thereof. In a similar manner, the compartment 74 also contains an extendible electric cord 82 for connection to an external power supply to provide power for all unit components and which is also mounted on a rotatable reel 84 for facilitating withdrawal and compact storage thereof.

Referring again to FIGURE 4, the subject unit includes a master control panel 90 disposed above the doors 64 at the end of the unit. Mounted thereon are suitable switches such as 92, 94, 96 for respectively operating the vacuum cleaner 66, washing machine 36 and other units. A dispensable paper towel roll holder 98 is preferably mounted on the door 64.

Figure 7:
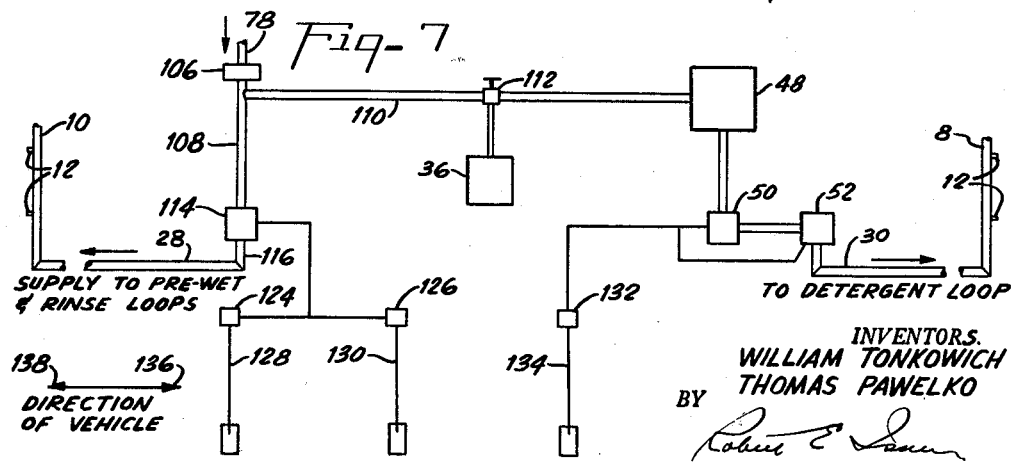
FIGURE 7 is a schematic diagram showing elements of the water and detergent supply systems and controls therefor.

Referring now to FIGURE 7, water is supplied by means of the water hose 78 connectable to an external water supply service through pipe 108. Included in the pipe 108 is a free flow water filter 106 to minimize spray nozzle clogging. Downstream thereof is a junction with a branch pipe 110 having a manually operable valve 112 therein for selectively supplying water, when desired, to the detergent solution tank 48 and to the washing machine 36. The pipe 108 is directly connected, through the solenoid actuated valve 114 and header 116 to the fixed vertical spray pipe 10 forming a portion of the water spray loop 28.

Actuation of the valve 114 to effect water flow is adapted to be effected by actuation of either or both of a pair of limit switches 124, 126 in response to displacement of extending actuating arms 128, 130, which are normally biased to a position perpendicular to the direction of vehicle advance, in either direction. As indicated, the actuating arms 128, 130 are adapted to be removably insertable into suitable receptacles in the enclosure 6 and are disposed so as to be displaceably responsive to the position of a vehicle relative to the water spray loop 28.

In a similar manner, the detergent solution pump 50 and the detergent solution solenoid controlled valve 52 are adapted to be simultaneously actuated in a similar manner by a one way limit switch 132 adapted to be actuated by selective displacement of an extending actuating arm 134 by the advance, but not the return of a vehicle through the detergent spray loop 30. As indicated, actuating arm 134 is adapted to be removably insertable into a suitable receptacle in the enclosure 6 so located as to be displaceably responsive to the position of a vehicle relative to the detergent loop 30 so as to effect a complete spraying of detergent solution thereon as the vehicle is advanced therepast.

As best shown in FIGURES 1 and 7, operation of the subject unit is effected by initially positioning the unit itself in a desired and suitable location, connecting the water supply hose 78 to a suitable cold water supply, connecting the power cord 82 to an electrical outlet and connecting the bridging spray pipes 24 and 26 to the vertical sections to form the illustrated spray loops 28 and 30. After insertion of the extending actuating arms 128, 130 and 134 in their respective receptacles in the housing 6, advance of a vehicle to be washed in the direction indicated by the arrow 136 (FIGURE 7) will effect initial displacement of arm 128. The arm 128 is so located that the required degree of displacement thereof to actuate limit switch 124 is effected when the nose of the car is slightly in advance of the water spray loop 28. Actuation of the limit switch 124 effects actuation of water valve 114 with a consequent flow of water through the spray loop 28 and through the spray nozzles 12 thereon to the vehicle as it continues its advance. This initial water spray serves to cool the vehicle, remove a portion of the dirt therefrom and to condition the surface thereof to receive the detergent solution. Continued vehicle advance will effect displacement of the second actuating arm 130 so as to assure continued water flow through the water spray loop 28 after release of the first arm 128 to thoroughly spray the rear of the vehicle. Continued vehicle advance will next effect selective directional displacement and actuation of control arm 134 with consequent actuation of the solenoid controlled valve 52 and detergent solution pump 50 in the detergent solution system to initiate a spray of detergent solution from the spray loop 30 on to the vehicle as it progresses therepast.

Following detergent solution application as described above, which of course automatically ceases when arm 134 is disengaged, the vehicle is given manual cleaning by brushing, to the extent that is or may be required, as well as necessary wheel cleaning or white wall tire scrubbing. After a suitable delay time to permit the applied detergent solution to function, the vehicle is returned through the spray loops, as indicated by the arrow 138. Such selective directional displacement does not effect actuation of the detergent system but again effects sequential actuation of the control arms 130 and 128 for the water spray loop 28. Such action effects a spray of clear cold water on to the detergent covered vehicle as it progresses past the water loop 28 to effect thorough rinsing thereof.

After such return passage through the above described spray loop system, the vehicle will be available for final manual cleaning operations such as interior vacuuming by means of the contained vacuum cleaning unit 66 in compartment 58; interior window cleaning and final exterior drying and check.

From the foregoing description of the unit and its operation it will be evident to those skilled in this art that in accordance with applicants' invention, there is provided an extremely compact, versatile, inexpensive and readily portable work center or unit for effecting the customized washing and cleaning of automotive vehicles in a highly efficient manner. Because of the units' ready mobility compact design and simplified set up operations, the subject unit can be located and made ready for operation in a matter of minutes at any convenient location, many of which were not heretofore suitable for such type of operation. As is also apparent, the small size and ready mobility permits the unit to be stored without inconvenience and be used both indoors and outdoors, thus avoiding the extended tie-up of work areas which can be used for other work. This is particularly important in the case of gas stations where flexibility is required for use of stall or yard spaces.

Moreover, the subject unit is adapted to produce a thoroughly clean car, in a matter of minutes, and can be easily operated by one man. This is particularly important in gas station operations where car washing is at best an intermittent occurence, usually not warranting the permanent tie-up of space or permanent labor cost, but which, because customer service is required, often presents a money losing proposition to the station owner. With the above described units, one man can wash up to five cars per hour with minimum operating costs and the resultant job compares favorably with that produced by permanent installations requiring a much higher initial cost as well as a tie-up of premium space and which requires a large number of personnel to operate even at partial capacity.

In view of the advantages expressed above, the herein described units are useful in many locations other than gas stations and garages and in areas where car washing is not now felt to be feasible as, for example, at motels, parking lots, country clubs, large apartment houses and adjacent supermarkets or shopping center areas.

It should also be noted that the subject units can also be used, with only minimum modification, on docks for the customized washing of small waterborne boats secured to the dock. The units can readily function to not only remove all salt water but to clean thoroughly the boat down to the water line on both sides thereof.

Variations and modifications in the details and arrangement of the parts may be resorted to within the true spirit and scope of the invention and it is intended to include all such variations and modifications in the appended claim.

We claim:

A mobile vehicle washing unit comprising, a wheeled compartmented storage housing, a source of pressurized detergent fluid supported in said housing, a plurality of spray sections with quick detachable connections for interconnection thereof to form spray archways, means for supporting said spray archways in horizontally spaced relation on and along one side of said housing, means including an interposed solenoid valve connecting at least one of said spray archways to said detergent fluid source, means including a second interposed solenoid valve for connecting another of said spray archways to a source of water under pressure, a limit switch for each of said first and second solenoids to selectively control actuation thereof and consequent flow of fluid through said spray archways and an actuator arm for each of said limit switches projecting from said wheeled housing for displaceable actuation by displacement of a vehicle to be washed therepast.

References Cited by the Examiner

UNITED STATES PATENTS

| | | | |
|---|---|---|---|
| 2,022,882 | 12/35 | Erdmann | 134—93 |
| 2,648,342 | 8/53 | Vani | 134—123 X |
| 2,732,846 | 1/56 | Berezny | 134—45 |
| 2,740,414 | 4/56 | Moskow | 134—123 X |
| 2,752,925 | 7/56 | Friers | 134—123 |
| 3,072,131 | 1/63 | Di Laurenzio | 134—123 |

CHARLES A. WILLMUTH, *Primary Examiner.*

GEORGE J. NORTH, *Examiner.*